Figure 1:
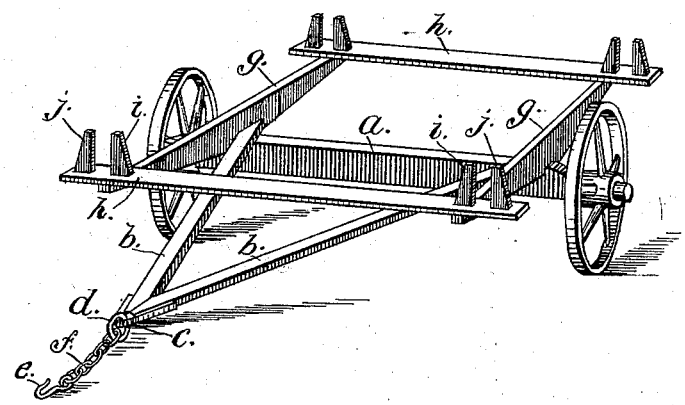

(No Model.)

A. B. REEVES.
TRUCK.

No. 267,801. Patented Nov. 21, 1882.

Witnesses:
Chas. M. Lowry.
Frank A. Jacob.

Inventor:
Alfred B. Reeves.
By H. P. Hood
Atty.

UNITED STATES PATENT OFFICE.

ALFRED B. REEVES, OF COLUMBUS, INDIANA, ASSIGNOR TO REEVES & CO. AND JOSEPH I. IRWIN, OF SAME PLACE.

TRUCK.

SPECIFICATION forming part of Letters Patent No. 267,801, dated November 21, 1882.

Application filed September 25, 1882. (No model.)

*To all whom it may concern:*

Be it known that I, ALFRED B. REEVES, a resident of Columbus, in the county of Bartholomew and State of Indiana, have invented a new and useful Improved Cart for Hauling Straw-Stackers, of which the following is a specification, having reference to the accompanying drawing.

My improved cart is particularly designed for moving from place to place a straw-stacking machine invented by Marshal I. Reeves and myself. Said stacking-machine consists essentially of a main frame, a turn-table, a straw-carrier, and mechanism for driving the same, and a derrick. The poles of said derrick are separable and in sections, and the straw-carrier is foldable and separable from the frame on which it is mounted when in action.

My invention consists in the construction and arrangement of parts as hereinafter described.

The drawing represents a perspective view of my improved cart.

A wooden axle, $a$, is fitted with a wheel of ordinary size and form at each end. Hounds $b\ b$ are secured at one end to the axle, and converging to a point about twelve feet distant are there united and provided with an eye, $c$, ring $d$, hook $e$, and short chain $f$. Side bars, $g\ g$, are fitted over and rest upon the axle, projecting equally forward and backward. Cross-bars $h\ h$ are fastened on top of the side bars at each end. By this arrangement the load rests on the ends of the side bars, and, the side bars being tapered vertically from the center toward each end, serve as springs and cause the load to ride easily and securely. Framed into and projecting upward from the cross-bars are uprights $i\ i$ and $j\ j$. Uprights $i$ are placed just far enough apart on each cross-bar to receive between them the chute of the stacker, and uprights $j$ are placed just far enough from uprights $i$ to receive between them the derrick-poles.

In moving from place to place my design is to couple my cart behind the thrasher or some other vehicle. For this purpose the eye $c$, chain $f$, hook $e$, and ring $d$ are provided.

I claim as my invention—

1. The above-described cart, consisting of an axle, a pair of wheels, spring side bars, $g\ g$, cross-bars $h\ h$, and uprights $i\ i$ and $j\ j$, all combined in the manner shown and described, and for the purpose set forth.

2. In combination with axle $a$, a pair of wheels, spring side bars, $g\ g$, cross-bars $h$, and uprights $i\ i$ and $j\ j$, the hounds $b\ b$, eye $c$, ring $d$, hook $e$, and chain $f$, in the manner shown and described, and for the purpose set forth.

ALFRED B. REEVES.

Witnesses:
 H. P. HOOD,
 FRANK A. JACOB.